(12) United States Patent
Yu et al.

(10) Patent No.: US 10,955,559 B2
(45) Date of Patent: Mar. 23, 2021

(54) GLOBAL NAVIGATION SATELLITE SYSTEM RECEIVER, APPLICATION PROCESSOR HAVING THE SAME, AND OPERATING METHOD OF THE GLOBAL NAVIGATION SATELLITE SYSTEM RECEIVER

(71) Applicant: SAMSUNG ELECTRONICS CO., LTD., Suwon-si (KR)

(72) Inventors: Ki-Soo Yu, Seoul (KR); Bhaskar Nallapureddy, San Jose, CA (US); Jae-Bum Cho, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 16/191,773

(22) Filed: Nov. 15, 2018

(65) Prior Publication Data
US 2019/0353796 A1    Nov. 21, 2019

(30) Foreign Application Priority Data
May 18, 2018   (KR) .......................... 10-2018-0057437

(51) Int. Cl.
*G01S 19/21*   (2010.01)
*H04W 52/24*   (2009.01)
*G01S 19/31*   (2010.01)

(52) U.S. Cl.
CPC .............. *G01S 19/21* (2013.01); *G01S 19/31* (2013.01); *H04W 52/243* (2013.01)

(58) Field of Classification Search
CPC ........ G01S 19/21; G01S 19/215; G01S 19/31; G01S 19/30; G01S 19/32; G01S 19/36; H04W 52/243
USPC ...................................................... 342/357.59
See application file for complete search history.

(56) References Cited

U.S. PATENT DOCUMENTS

| | | | |
|---|---|---|---|
| 6,993,296 B2 | 1/2006 | Leyh et al. | |
| 7,994,975 B2 | 8/2011 | Abraham et al. | |
| 8,253,624 B2 | 8/2012 | King et al. | |
| 8,767,616 B2 | 7/2014 | Choi et al. | |
| 8,862,060 B2 | 10/2014 | Mayor et al. | |
| 9,420,547 B2 | 8/2016 | Gao et al. | |
| 9,439,031 B2 | 9/2016 | Sang et al. | |
| 9,632,183 B2 | 4/2017 | Zehnpfennig et al. | |
| 2010/0119020 A1 | 5/2010 | Bhukania et al. | |
| 2018/0035444 A1* | 2/2018 | Wu | H04W 72/02 |

* cited by examiner

*Primary Examiner* — Harry K Liu
(74) *Attorney, Agent, or Firm* — F. Chau & Associates, LLC

(57) ABSTRACT

A global navigation satellite system (GNSS) receiver includes an internal signal processor configured to perform an internal signal processing operation on a satellite signal to generate satellite information, a switching circuit configured to transmit the satellite signal to the internal signal processor, and a control circuit configured to receive a blanking signal from an external communication device instructing that the internal signal processing operation is to be blocked, and configured to output control information for reducing transmission power of the external communication device and to control the switching circuit to transmit the satellite signal to the internal signal processor regardless of the blanking signal when a frequency at which the blanking signal is received exceeds a reference value.

20 Claims, 14 Drawing Sheets

GLOBAL NAVIGATION SATELLITE SYSTEM RECEIVER, APPLICATION PROCESSOR HAVING THE SAME, AND OPERATING METHOD OF THE GLOBAL NAVIGATION SATELLITE SYSTEM RECEIVER

CROSS-REFERENCE TO RELATED APPLICATION

This U.S. non-provisional application claims the benefit of priority under 35 U.S.C. § 119 to Korean Patent Application No. 10-2018-0057437, filed on May 18, 2018, in the Korean Intellectual Property Office, the disclosure of which is incorporated by reference in its entirety herein.

BACKGROUND

1. Technical Field

The inventive concept relates to a global navigation satellite system receiver, and more particularly, to a global navigation satellite system receiver for reducing degradation of the performance due to interference of an external communication device, an application processor including the global navigation satellite system receiver, and an operating method of the global navigation satellite system receiver.

2. Discussion of Related Art

A global navigation satellite system (GNSS) refers to a system configured to provide position information of a ground object by using satellites circling the earth's orbit. The GNSS may include a plurality of GNSS satellites and at least one GNSS receiver. A GNSS receiver may be located in a mobile device, such as a terminal, and thus, position information of the terminal may be calculated.

Along with the GNSS receiver, various communication devices for performing communication functions, such as a modem, may be included in the terminal. However, a harmonic element of a carrier frequency of the communication devices may operate as interference with a frequency band of the GNSS receiver, and this interference may degrade the performance of the GNSS receiver.

SUMMARY

At least one embodiment of the inventive concept provides a global navigation satellite system receiver for reducing degradation of its performance due to interference of an external communication device, an application processor including the global navigation satellite system receiver, and an operating method of the global navigation satellite system receiver.

According to an exemplary embodiment of the inventive concept, there is provided a global navigation satellite system (GNSS) receiver including an internal signal processor configured to perform an internal signal processing operation on a satellite signal to generate satellite information, a switching circuit configured to transmit the satellite signal to the internal signal processor, and a control circuit configured to receive a blanking signal from an external communication device instructing that the internal signal processing operation is to be blocked, and configured to output control information for reducing transmission power of the external communication device and to control the switching circuit to transmit the satellite signal to the internal signal processor regardless of the blanking signal when a frequency at which the blanking signal is received exceeds a reference value.

According to an exemplary embodiment of the inventive concept, there is provided an operating method of a global navigation satellite system (GNSS) receiver. The method includes receiving, from a modem circuit, a blanking signal for instructing to block a decoding operation with respect to a satellite signal; blocking, in response to the blanking signal, a decoding operation with respect to satellite information transmitted from one or more satellites; determining whether a frequency at which the blanking signal is received exceeds a certain reference value; and outputting control information for adjusting power used for data communication of the modem circuit when the frequency is determined to exceed the certain reference value.

According to an exemplary embodiment of the inventive concept, there is provided an application processor including a modem circuit configured to output a transmission signal via an external communication, and to generate a blanking signal for instructing to block a signal processing operation, when performing a communication causing interference with another communication device, and a global navigation satellite system (GNSS) receiver configured to perform a decoding operation by on a satellite signal received from one or more satellites, and to block the decoding operation with respect to the satellite signal in response to the blanking signal provided from the modem circuit, wherein the GNSS receiver includes a control circuit. The control circuit is configured to output control information for reducing a transmission power of the modem circuit and perform a control operation such that the decoding operation with respect to the satellite signal is performed regardless of the blanking signal when a frequency at which the blanking signal is received exceeds a reference value. The control circuit is configured to perform a control operation such that the decoding operation with respect to the satellite signal is blocked when the frequency does not exceed the reference value.

According to an exemplary embodiment of the inventive concept, a mobile device is provided. The mobile device includes a GNSS receiver and a modem circuit. The GNSS receiver includes a switching circuit and a signal processor configured to perform an operation on a satellite signal. The modem circuit is configured to transmit a transmission signal at a first power level using a mobile communication standard, and output a blanking signal to the GNSS receiver while the transmission signal is transmitted. The switching circuit prevents the satellite signal from being transmitted to the signal processor when the blanking signal is received at a frequency less than a reference value. The switching circuit allows the satellite signal to be transmitted to the signal processor when the frequency is greater than the reference value. The GNSS receiver outputs control information to the modem circuit when the frequency is greater than the reference value. The modem circuit transmits the transmission signal at a second power level less than the first power level in response to the control information.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

Hereinafter, exemplary embodiments of the inventive concept will be described in detail by referring to the accompanying drawings.

Figure 1:
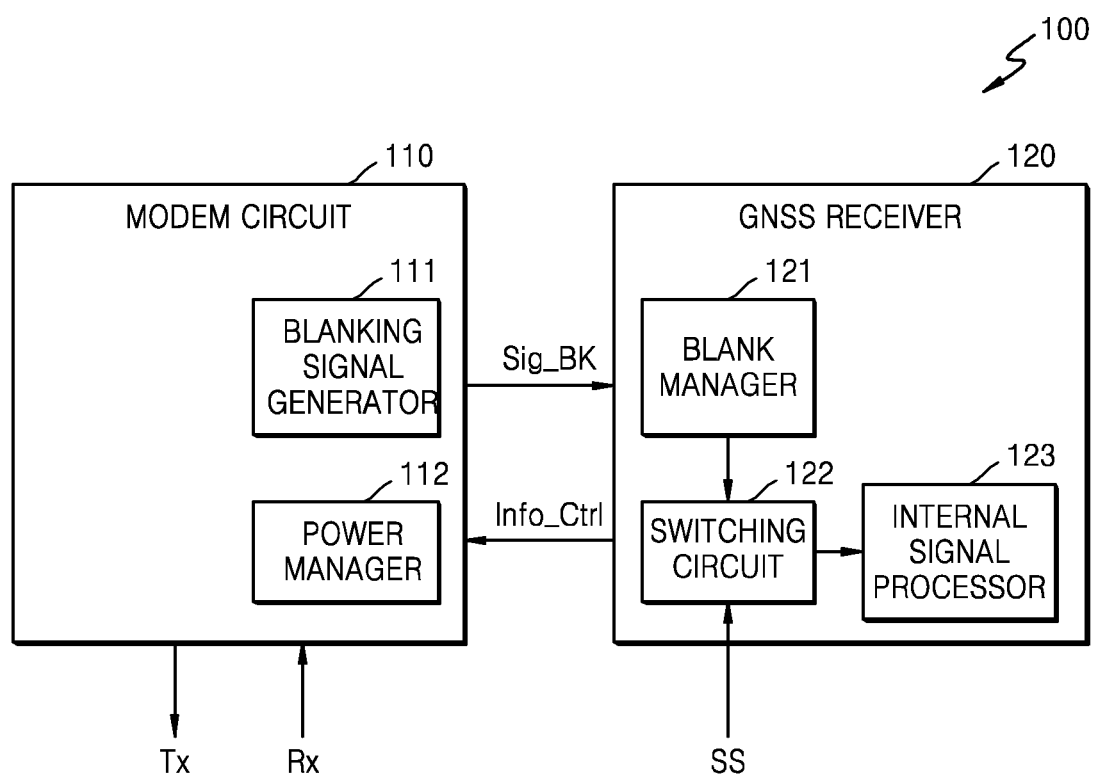
FIG. 1 is a block diagram of a system including a global navigation satellite system (GNSS) receiver, according to an exemplary embodiment of the inventive concept.

FIG. 1 is a block diagram of an electronic system 100 including a global navigation satellite system (GNSS) receiver 120, according to an exemplary embodiment of the inventive concept.

Referring to FIG. 1, the electronic system 100 includes a modem circuit (or a modem) 110 and the GNSS receiver 120. According to an embodiment, the electronic system 100 is a mobile system (e.g., device), wherein the mobile system may be a certain portable electronic device, such as a mobile phone, a smart phone, a tablet personal computer (PC), a laptop computer, a personal digital assistant (PDA), a portable multimedia player (PMP), a digital camera, a music player, a portable game console, a navigation system, etc. Alternatively, according to an embodiment, the electronic system 100 may be a wearable electronic device, such as a smart watch, a wrist band electronic device, a wearable computer, etc.

The modem circuit 110 may perform communication based on various mobile communication standards, such as $3^{rd}$ generation (3G), global system for mobile communications (GSM), general packet radio service (GPRS), code-division multiple access (CDMA), wideband CDMA (WCDMA), time-division multiple access (TDMA), long-term evolution (LTE), and high speed packet access (HSPA). For example, a radio frequency (RF) chip for a modem outside the modem circuit 110 may receive a high frequency signal via an antenna and process the received high frequency signal, and the RF chip may provide a low frequency signal corresponding to a baseband signal to the modem circuit 110. In an embodiment, the RF chip for the modem is located in the modem circuit 110. The modem circuit 110 may output a transmission signal Tx via the RF chip and may receive a reception signal Rx via the RF chip. For example, the reception signal Rx may be the low frequency signal corresponding to the baseband signal.

The GNSS receiver 120 may receive a satellite signal (or a GNSS signal) SS from GNSS satellites via a GNSS antenna (not shown) provided in the electronic system 100. The GNSS satellites may include various types of satellites, such as a global positioning system (GPS), Galileo, Glonass, BeiDou (Compass), etc., but are not limited thereto. Galileo is the GNSS that is being created by the European Union. Glonass is the GNSS that was developed by the Soviet Union. BeiDou is the GNSS that was developed by China. For example, an RF chip for a GNSS may receive a satellite signal of a high frequency band from one or more satellites and process the received satellite signal to generate and provide a satellite signal SS of a low frequency to the GNSS receiver 120. For example, the RF chip for the GNSS may perform filtering, amplifying, down-converting, sampling, digitizing, etc. on the received satellite signal. According to an embodiment, the RF chip for the GNSS is located in the GNSS receiver 120.

The GNSS receiver 120 receives the satellite signal SS and extracts satellite information from the satellite signal SS by performing a decoding operation on the satellite signal SS. The satellite information may include various information, such as a location of a satellite generating the satellite signal SS, and a time or a speed in which the satellite signal SS is generated. Also, the GNSS receiver 120 may generate position information indicating a location of the electronic system 100 or a movement path of the electronic system 100 via a signal processing operation using the satellite information.

The modem circuit 110 may perform a communication via a certain frequency band that is pre-set, and a harmonic element from a carrier frequency of the frequency band, via which the modem circuit 110 performs the communication, may cause interference with the GNSS receiver 120. For example, when the modem circuit 110 performs a communication based on the LTE standards, certain bands (for example, band 13, band 14, etc.) of a plurality of bands used for the data communication may cause interference with the GNSS receiver 120. For example, when the modem circuit 110 outputs a transmission signal Tx, an interference signal may be included in a satellite signal SS received by the GNSS receiver 120, due to the harmonic element from the modem circuit 110.

In an embodiment, the modem circuit 110 includes a blanking signal generator 111, wherein the blanking signal generator 111 generates a blanking signal Sig_BK and provides the blanking signal Sig_BK to the GNSS receiver 120 (e.g., a receiver circuit). For example, the modem circuit 110 may activate the blanking signal Sig_BK at a timing in which the harmonic element causing the interference signal in the carrier frequency band of the GNSS receiver 120 is generated and provide the blanking signal Sig_BK to the GNSS receiver 120. For example, the modem circuit 110 may activate the blanking signal Sig_BK at a timing in which the transmission signal Tx is output. For example, the modem circuit 100 could output the blanking signal Sig_BK with a first level (deactivated) when not outputting the transmission signal Tx and output the blanking signal Sig_Bk with a second level (activated) different from the first level when outputting the transmission signal Tx. In addition, the modem circuit 110 may control whether or not to activate the blanking signal Sig_BK based on various determination references. For example, the modem circuit 110 may control whether or not to activate the blanking signal Sig_BK by taking into account at least one of the carrier frequency band used to output the transmission signal Tx and an output power of the transmission signal Tx.

The GNSS receiver 120 includes a blank manager 121 (e.g., a control circuit), a switching circuit 122, and an internal signal processor 123. The blank manager 121 controls whether or not to perform a signal processing operation using the satellite signal SS in the GNSS receiver 120, according to an exemplary embodiment. The signal processing operation may be used to calculate the position of the electronic system 100. For example, the blank manager 121 may block the signal processing operation from using the satellite signal SS in response to a blanking signal Sig_BK. Also, the switching circuit 122 may transmit the satellite signal SS received from the outside to the internal signal processor 123 in the GNSS receiver 120 or block the transmission. For example, the switching circuit 122 may transmit the satellite signal SS to the internal signal processor 123 or block the satellite signal SS from being transmitted to the internal signal processor 123, under control of the blank manager 121. The internal signal processor 123 may perform various types of signal processing operations. For example, the internal signal processor 123 may extract satellite information via a decoding operation with respect to the satellite signal SS or may calculate position information via a signal processing operation using the satellite information. For example, when the blanking signal Sig_BK is activated, the blank manager 120 can output a control signal at a first level to the switching circuit 122 that prevents the switching circuit 122 from passing the satellite signal SS to the internal signal processor 123. For example, when the blanking signal Sig_BK is deactivated, the blank manager 120 can output a control signal at a second level to the switching circuit 122 that causes the switching circuit 122 to pass the satellite signal SS to the internal signal processor 123.

For example, the modem circuit 110 may transmit a sub-frame of data in a unit of 1 millisecond (msec) as a transmission signal Tx. However, a volume (e.g., a quantity of data) of the satellite signal SS transmitted per second, the satellite signal being received by the GNSS receiver 120, is small (e.g., 50 Hz per second), and thus, even if some satellite signals SS in a unit of several msecs are not used for the decoding operation, the accuracy of the position information calculated by the GNSS receiver 120 may be obtained. By taking this aspect into account, when the blanking signal Sig_BK is provided from the modem circuit 110 or the blanking signal Sig_BK is activated, the blank manager 121 may block the satellite signal SS from being transmitted to the internal signal processor 123 by controlling the switching circuit 122. That is, the GNSS receive 120 may perform the decoding operation without using the received satellite signal SS, at the timing in which the harmonic element is generated, and thus, the degradation of the accuracy of the position information may be prevented.

When the modem circuit 110 performs the communication operation generating the harmonic element for a long period of time, and thus, the blanking signal Sig_BK is frequently provided to the GNSS receiver 120, the volume of the satellite signal SS, with respect to which the decoding operation is not performed, may be increased, so that the accuracy of the position information of the GNSS receiver 120 is degraded or a speed of the calculation of position is decreased. According to an exemplary embodiment, even if the blanking signal Sig_BK is received from the modem circuit 110, the blank manager 121 controls the satellite signal SS to be transmitted to the internal signal processor 123 based on a certain determination operation, and thus, the accuracy of the position information of the GNSS receiver 120 is not degraded.

According to an embodiment, the blank manager 121 controls the switching circuit 122 based on a result of monitoring a frequency at which the blanking signal Sig_BK is received. For example, when the frequency at which the blanking signal Sig_BK is received is equal to or less than a certain reference value, the blank manager 121 controls the switching circuit 122 to block the satellite signal SS from being transmitted to the internal signal processor 123 in response to the blanking signal Sig_BK. For example, when the frequency at which the blanking signal Sig_BK is received exceeds the certain reference value, the blank manager 121 controls the switching circuit 122 to transmit the satellite signal SS to the internal signal processor 123 regardless of the blanking signal Sig_BK.

The blank manager 121 may determine whether or not the frequency at which the blanking signal Sig_BK is received exceeds the certain reference value, based on various references. For example, the blank manager 121 may perform the determination based on the number of times in which the blanking signal Sig_BK is received during a certain period of time. For example, the blank manager 121 could increment a counter each time the blank signal Sig_Bk is activated within the period of time and divide the count by the period of time to determine the frequency. Alternatively, the blank manager 121 may perform the determination based on the number of times in which the blanking signal Sig_BK is continually received. For example, if the blanking signal Sig_BK is received more than a certain number of times during a given period, it could be concluded that the blanking signal Sig_BK is being received too often, and thus the blanking manager 121 can allow the decoding or signal processing operation to be performed. Based on these various references, the blank manager 121 may perform the control operation such that the satellite signal SS is transmitted to the signal processing block regardless of the reception of the blanking signal Sig_BK, in a situation where the accuracy of the position information is degraded since the frequency at which the blanking signal Sig_BK is received is relatively high.

According to an embodiment, when the frequency at which the blanking signal Sig_BK is received is relatively high, the blank manager 121 performs a control operation such that an intensity of a harmonic element affecting the GNSS receiver 120 is decreased. For example, the blank manager 121 outputs control information Info_Ctrl for controlling a power amplifier disposed outside the modem circuit 110 to reduce power (for example, transmission power) of the transmission signal Tx of the modem circuit 110.

For example, the modem circuit 110 may further include a power manager 112 (e.g., a power managing circuit). The power manager 112 may perform an operation of managing power of the transmission signal Tx and/or the reception signal Rx, for the data communication of the modem circuit 110. For example, the power manager 112 may adjust the power of the transmission signal Tx by controlling, based on the control information Info_Ctrl, an RF chip or the power amplifier disposed outside the modem circuit 110.

FIG. 1 illustrates an example in which the blank manager 121 provides the control information Info_Ctrl to the modem circuit 110, and a power amplifier disposed outside the modem circuit 110 is adjusted based on the control information Info_Ctrl. However, embodiments of the inventive concept are not limited thereto. For example, the blank manager 121 may directly provide the control information Info_Ctrl to the RF chip or the power amplifier disposed outside the modem circuit 110. That is, the blank manager 121 may adjust the ultimate transmission power in the communication using the modem circuit 110 by providing the control information Info_Ctrl. For example, when the frequency at which the blanking signal Sig_BK is received exceeds a threshold frequency, the blank manager 121 can provide the control information Info_Ctrl to the modem circuit 110 so that the modem circuit 110 outputs the transmission signal Tx with a power level less than or equal a threshold level. The transmission signal Tx may be output with a power level above the threshold level when the frequency at which the blanking signal Sig_BK is received is less than or equal the threshold frequency.

During a section (e.g., a time period) in which the power of the transmission signal Tx is reduced as described above, the GNSS receiver 120 transmits the satellite signal SS to the internal signal processor 123 even if the blanking signal Sig_BK is received. That is, an intensity of an interference signal generated in the satellite signal SS may be reduced via the reduction of the power of the transmission signal Tx of the modem circuit 110, and thus, effects on the decoding operation with respect to the satellite signal SS, wherein the effects are caused by the interference signal, may be reduced or removed.

According to an exemplary embodiment, the section (e.g., time period) during which the power of the transmission signal Tx is reduced is variably set. For example, the section in which the power of the transmission signal Tx is reduced may be pre-set, and after the pre-set section, the blank manager 121 outputs the control information Info_Ctrl so that the power of the transmission signal Tx becomes set to a previous level (or such that the power of the transmission signal Tx is increased). In an alternative embodiment, the blank manager 121 monitors the accuracy of the position information in the GNSS receiver 120 in real time or periodically, and when the accuracy is obtained as a level that is equal to or greater than a certain reference, the blank manager 121 outputs the control information Info_Ctrl so that the power of the transmission signal Tx is increased. When the power of the transmission signal Tx is increased to a previous level, the blank manager 121 blocks the satellite signal SS from being transmitted to the internal signal processor 123 when the blanking signal Sig_BK is received.

Structures of the GNSS receiver 120 according to embodiments may be variously realized. For example, each of the blank manager 121 and the internal signal processor 123 may be realized as hardware or software. Alternatively, each of the blank manager 121 and the internal signal processor 123 may be realized as a combination of hardware and software.

According to an exemplary embodiment, the GNSS receiver 120 discards the satellite signal SS which may include an interference signal, in response to the blanking signal Sig_BK, and thus, degradation of the accuracy of the position information may be prevented. Also, the GNSS receiver 120 may prevent the satellite signal SS from being excessively discarded due to frequent reception of the blanking signal Sig_BK, and thus, the reduction in accuracy of the position information due to the loss of the satellite signal SS may be prevented.

Figure 2:
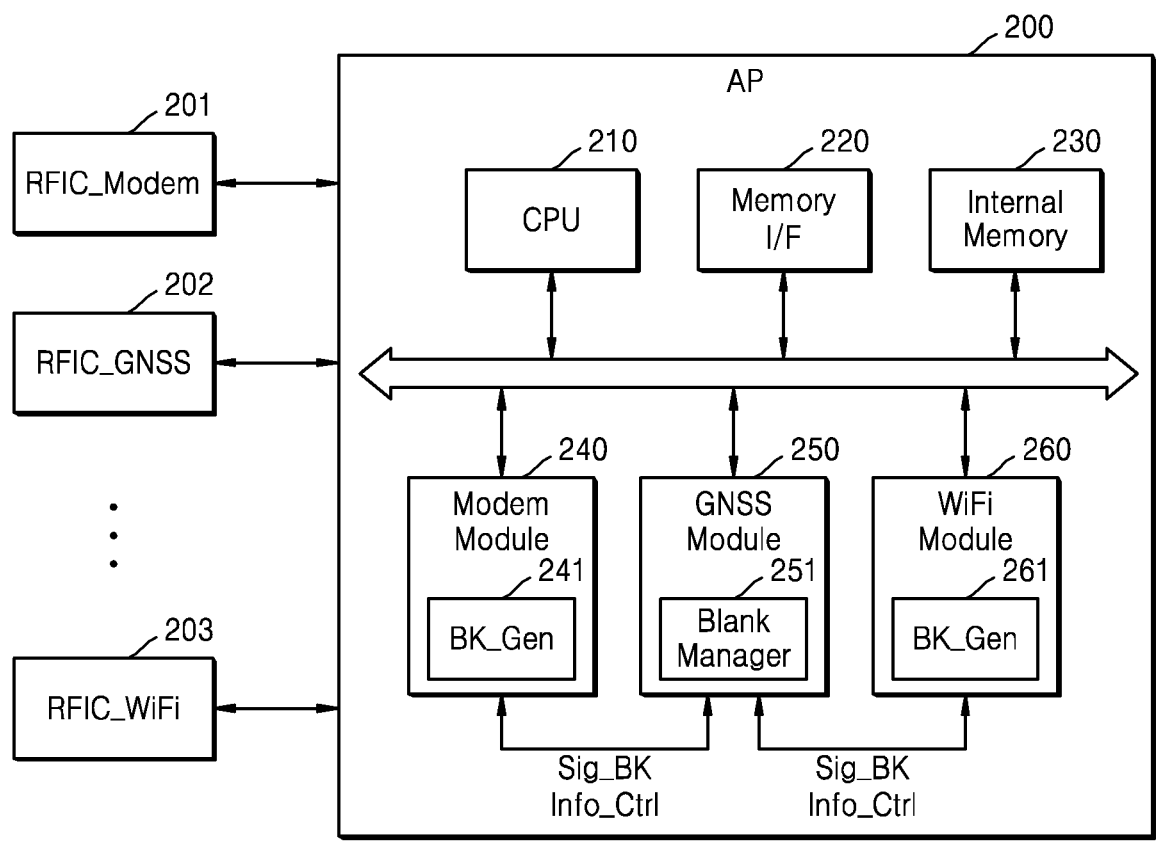
FIG. 2 is a block diagram of an example in which a GNSS receiver is implemented in an application processor, according to an exemplary embodiment of the inventive concept.

FIG. 2 is a block diagram of an example in which a GNSS receiver according to an embodiment of the inventive concept is implemented in an application processor 200. The application processor 200 of FIG. 2 may further include the modem circuit 110 described above. Also, since the application processor 200 performs a modem function, the application processor 200 may be referred to as a modem application processor (ModAP).

Referring to FIG. 2, the application processor 200 may be realized as a system on chip (SoC), and may include a central processing unit (CPU) 210, a memory interface 220, and an internal memory 230. Also, the application processor 200 may further include a modem module 240, as the modem circuit 110 described above, a GNSS module 250, as the GNSS receiver 120 described above, and a Wi-Fi module 260 (e.g., WI-FI communication circuit), as an example of modules performing other types of communications. FIG. 2 illustrates the Wi-Fi module 260 as a device performing other types of communications. However, the application processor 200 may include various types of communication modules, such as a device configured to communicate over a Wireless Local Area Network (WLAN), a device configured to communicate using the Bluetooth (BT) standard, etc.

The CPU 210 may control functions of the application processor 200 by executing various programs. Also, the memory interface 220 may perform an interface with a memory (for example, volatile memories, such as dynamic random access memory (DRAM), static random access memory (SRAM), etc., non-volatile memories, etc.) disposed outside the application processor 200, and an internal memory 230 may store various programs for controlling operations of the application processor 200. Also, when some of the functions according to exemplary embodiments are realized via software, programs corresponding to the software may be stored in an external memory (not shown) or the internal memory 230. The programs may be executed by various types of processors, such as the CPU 210, a processor (not shown) included in the modem module 240, a processor (not shown) included in the GNSS module 250, etc.

Various components in the application processor 200 may be connected to one another based on a system bus. For example, as a standard type of the system bus, an advanced microcontroller bus architecture (AMBA) protocol of the advanced RISC machine (ARM) may be applied. Buses of the AMBA protocol may include an advanced high-performance bus (AHB), an advanced peripheral bus (APB), an advanced extensible interface (AXI), an AXI4, AXI coherency extensions (ACE), etc.

Various types of communication chips may be further arranged in an electronic system in which the application processor 200 is mounted. For example, FIG. 2 illustrates a first RF chip (or an RFIC_modem) 201 configured to process a high frequency signal in relation to a modem function, a second RF chip (or an RFIC_GNSS) 202 configured to process a high frequency signal in relation to a GNSS function, a third RF chip (or an RFIC_Wi-Fi) 203 configured to process a high frequency signal in relation to a Wi-Fi function, etc. As described above, when the electronic system supports various types of communication functions, other types of RF chips, in addition to the RF chips illustrated in FIG. 2, may further be included in the electronic system.

The modem module 240 may include a blanking signal generator 241 configured to generate a blanking signal Sig_BK according to the embodiment described above, and the GNSS module 250 may include a blank manager 251. For example, the blanking signal generator 241 may be implemented by the blanking signal generator 111 and the blank manager 251 may be implemented by the blank manager 121. The blank manager 251 may manage a blanking operation for performing or blocking a decoding operation with respect to a satellite signal in response to the blanking signal Sig_BK according to the embodiment described above. Similarly, interference may be caused with the GNSS module 250 due to communication operation of the Wi-Fi module 260, and the Wi-Fi module 260 may generate the blanking signal Sig_BK and provide the blanking signal Sig_BK to the GNSS module 250, in the same or substantially the same method as the method described in the embodiment above. Accordingly, the Wi-Fi module 260 may include a blanking signal generator 261. For example, the blanking signal generator 261 may be implemented by the blanking signal generator 111.

According to an embodiment, the modem module 240 and the GNSS module 250 transmit and receive information to and from each other via physical wires. For example, the modem module 240 may provide the blanking signal Sig_BK to the GNSS module 250, and the GNSS module 250 may provide control information Info_Ctrl for adjusting transmission power of the modem module 240 to the modem module 240. Also, the Wi-Fi module 260 and the GNSS module 250 may transmit and receive information to and from each other via physical wires. For example, the Wi-Fi module 260 may provide the blanking signal Sig_BK to the GNSS module 250 and the GNSS module 250 may provide control information Info_Ctrl for adjusting transmission power of the Wi-Fi module 260 to the Wi-Fi module 260.

FIG. 2 illustrates an example in which the GNSS module 250 provides the control information Info_Ctrl to each of the modem module 240 and the Wi-Fi module 260. However, embodiments are not limited thereto. As described above, the GNSS module 250 may directly provide the control information Info_Ctrl to the RFIC_Modem 201 and the RFIC_Wi-Fi 203 disposed outside the application processor 200.

Figure 3A:
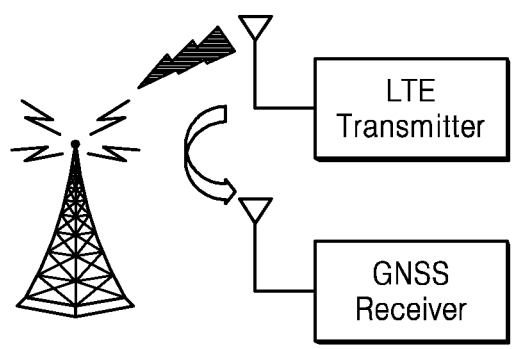
FIGS. 3A and 3B show examples in which an interference signal is generated in a GNSS receiver, via a communication circuit.
Figure 3B:
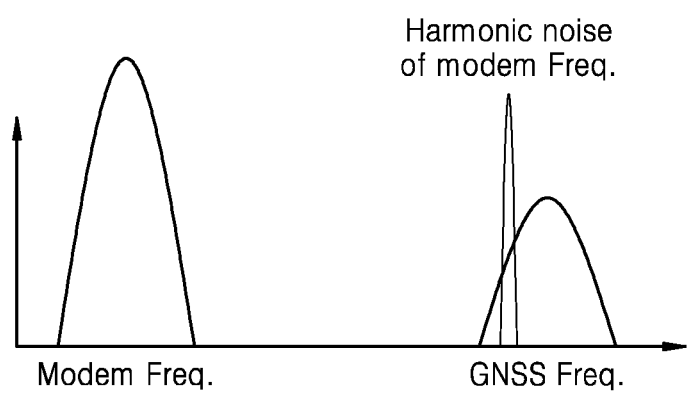

FIGS. 3A and 3B show examples in which an interference signal is generated in a GNSS receiver. It is assumed in FIGS. 3A and 3B that the interference signal is generated in the GNSS receiver when a transmission signal is output by a modem complying with the LTE standards.

Referring to FIGS. 3A and 3B, as various types of communication devices are included in an electronic system, the communication devices may be integrated on the same semiconductor chip or may be adjacently located with respect to one another. Also, a frequency band used by the modem for the data communication may be less than a frequency band used by the GNSS receiver to receive a satellite signal. Accordingly, an interference signal having a noise frequency (for example, a noise frequency having a value generated by multiplying the carrier frequency by integers) related to a carrier frequency during an operation of outputting the transmission signal by the modem may be generated in the GNSS receiver. The GNSS receiver may extract satellite information (for example, information, such as a position, time and speed of a satellite) via a decoding operation using received satellite signals, and since the interference signal is included in the decoding operation, the accuracy of the satellite information (or position information calculated by using the satellite information) may be decreased.

Figure 4:
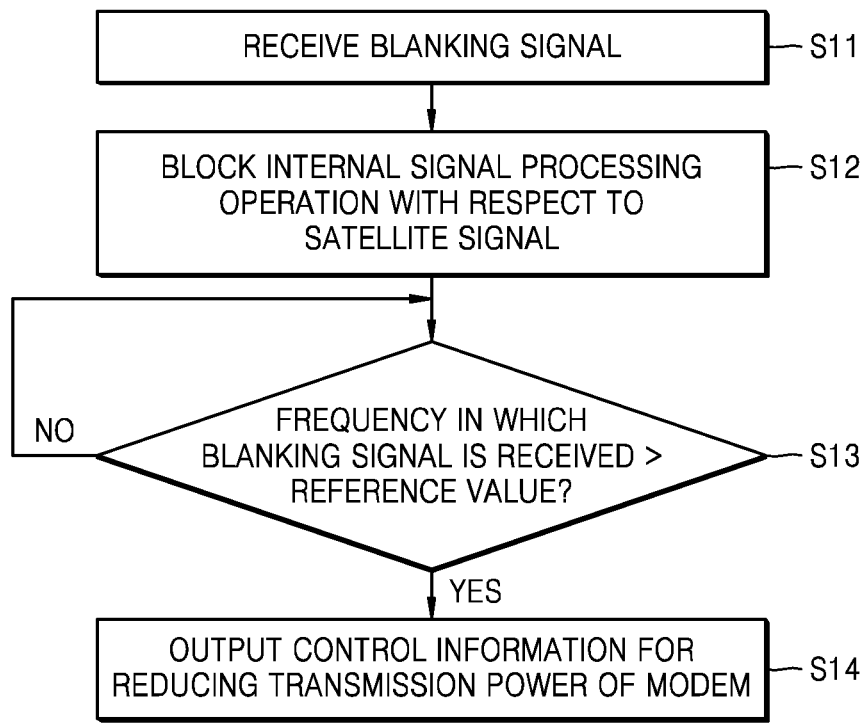
FIGS. 4 through 6 are flowcharts of an operating method of a GNSS receiver, according to exemplary embodiments of the inventive concept.
Figure 5:
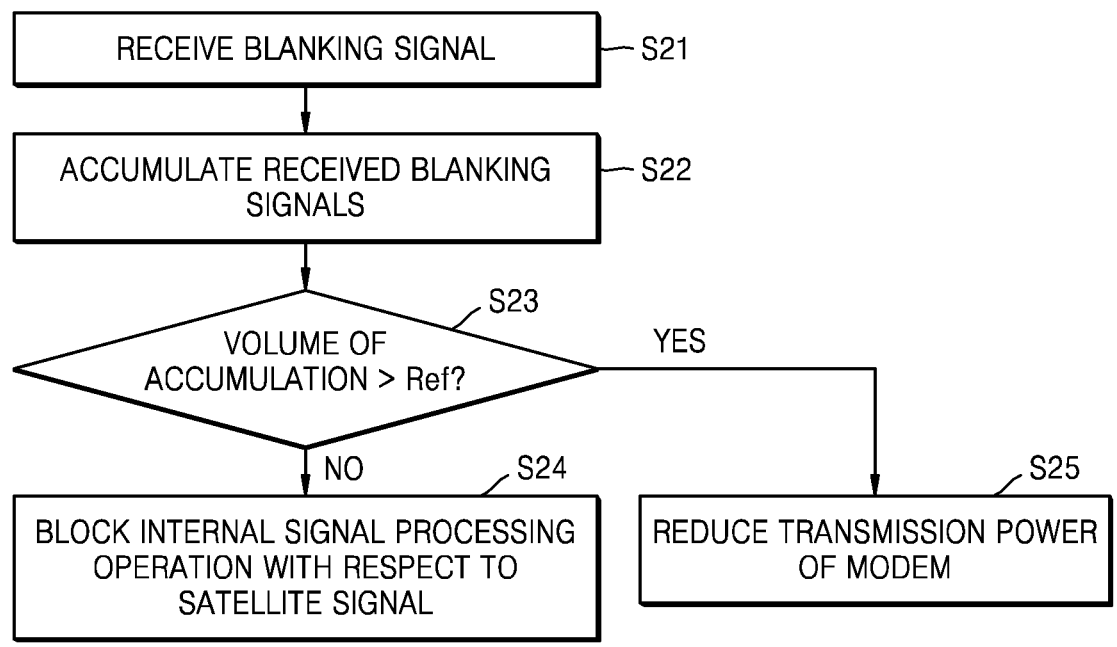
Figure 6:
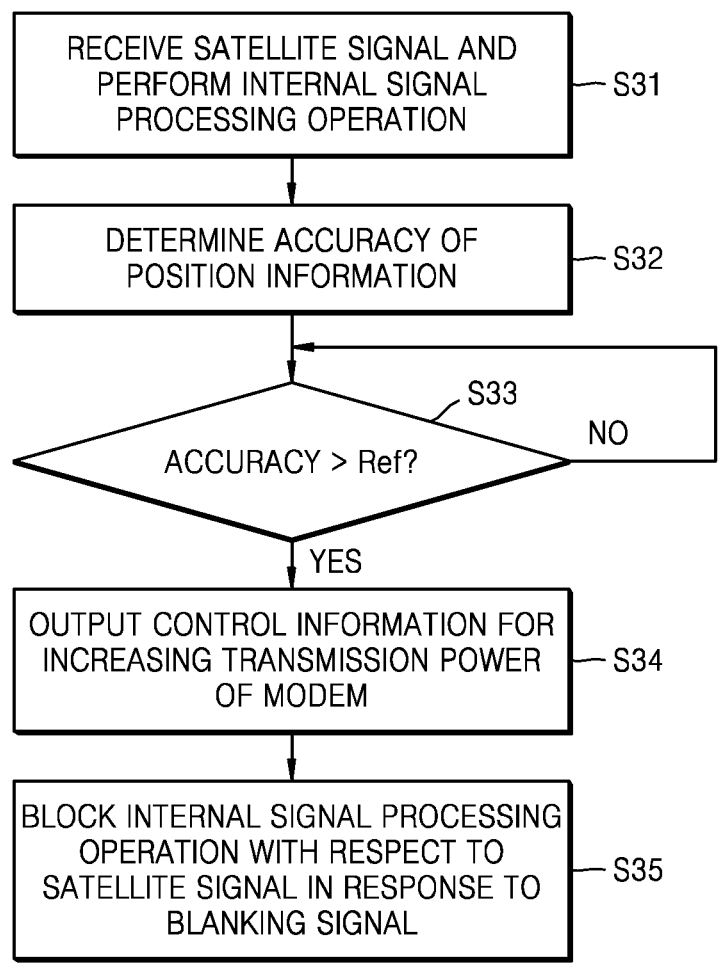

FIGS. 4 through 6 are flowcharts of an operating method of a GNSS receiver, according to exemplary embodiments of the inventive. In the embodiments described hereinafter, the GNSS receiver is discussed as including a GNSS reception circuit configured to process a baseband signal. Also, the GNSS receiver may further include an RF chip receiving a high frequency satellite signal via an antenna.

First, referring to FIG. 4, the GNSS receiver transmits and receives one or more pieces of information to and from a modem circuit via hardware connection wires, and the GNSS receiver receives, from the modem circuit, a blanking signal (S11). The receipt of the blanking signal indicates to the GNSS receiver that it should discard or ignore a satellite signal because it may include noise or an interference signal. The GNSS receiver may receive the satellite signal based on a certain cycle and perform an internal processing operation, such as a decoding operation, etc., with respect to the received satellite signal. For example, the GNSS receiver may be designed to periodically sample an input port for a satellite signal. The GNSS receiver blocks the internal processing operation with respect to the received satellite signal when the blanking signal is received from the modem circuit (S12). For example, the GNSS receiver may prevent the internal processing operation from operating on a newly received satellite signal or prevent the input port from being sampled while the blanking signal has an activated level.

Also, the GNSS receiver may determine a frequency at which the blanking signal is received from the modem circuit. For example, the GNSS receiver determines whether the frequency at which the blanking signal is received exceeds a certain reference value (S13). When the frequency at which the blanking signal is received exceeds the reference value, it indicates a state in which the received satellite signal is excessively discarded, so that the accuracy of the position information calculated by the GNSS receiver may be degraded.

When the frequency at which the blanking signal is received does not exceed the reference value, the GNSS receiver may periodically perform the operation of determining the frequency at which the blanking signal is received. However, when the frequency at which the blanking signal is received exceeds the reference value, the GNSS receiver outputs control information for reducing transmission power of the modem (S14). The control information may be provided to the modem circuit (or a power amplifier adjusting the transmission power), and the modem circuit may perform a communication with reduced power for reducing or removing a harmonic element which may cause interference with the GNSS receiver.

FIG. 5 illustrates an example of the operation of the GNSS receiver, in a case where the operation of determining the frequency at which the blanking signal is received includes an operation of determining a volume of accumulated blanking signals during a certain time period.

The GNSS receiver receives the blanking signal (S21) and accumulates the received blanking signal with previously received signals (S22). The accumulation operation may include an operation of counting whenever a blanking signal is received. For example, a counter may be incremented each time the blanking signal is received or each time an activated portion of the blanking signal is recognized.

The blank manager described above may determine whether the volume of the accumulated blanking signals during a certain time period exceeds a certain reference value Ref. Accordingly, whenever the blanking signal is received, in some cases, it may be determined that the volume of the accumulated blanking signals exceeds the reference value Ref, and in other cases, it may be determined that the volume of the accumulated blanking signals does not exceed the reference value Ref.

When the volume of the accumulated blanking signals does not exceed the reference value Ref, the GNSS receiver blocks the internal processing operation with respect to the satellite signal, in response to the blanking signal (S24). However, when the volume of the accumulated blanking signals exceeds the reference value Ref, the GNSS receiver outputs control information for reducing transmission power of the modem circuit (S25). In an embodiment, the volume of accumulated blanking signals that does not exceed the reference value, but still causes the GNSS receiver to block the internal processing operation is non-zero.

The volume of the accumulated blanking signals may be monitored periodically or in real time, or may be determined whenever the blanking signal is received or activated. In an exemplary embodiment, when it is determined at a certain time point after the volume of the accumulated blanking signals exceeds the reference value Ref, that the volume of the accumulated blanking signals does not exceed the reference value Ref, the GNSS receiver outputs the control information for restoring (or increasing) the transmission power of the modem circuit to a previous state.

FIG. 6 illustrates an example in which the blanking operation is controlled based on the accuracy of the position information calculated by the GNSS receiver. That is, FIG. 6 illustrates an example in which accuracy of the position information is used as a reference for the determination for the GNSS receiver to increase the transmission power of the modem circuit again, after reducing the transmission power of the modem circuit. In an embodiment, the GNSS receiver uses satellite signals received from multiple satellites to determine the position information. In an embodiment, the accuracy is based on the number of satellites for which satellite signals were received during a given period.

Referring to FIG. 6, the GNSS receiver receives the satellite signal and performs an internal processing operation with respect to the satellite signal (S31). For example, in a state in which the GNSS receiver reduced the transmission power of the modem circuit, the GNSS receiver performs the internal signal processing operation with respect to the satellite signal regardless of the reception of the blanking signal. Also, the GNSS receiver may extract the satellite information via the internal signal processing operation and may calculate the position information via the internal signal processing operation using the satellite information. The GNSS receiver determines the accuracy of the calculated position information (S32).

The GNSS receiver may randomly or periodically determine the accuracy of the calculated position information. The GNSS receiver compares the accuracy of the position information with a second reference value Ref (S33). The GNSS receiver may determine whether or not to apply the blanking operation based on a result of the comparison. When the accuracy of the position information is not greater than the second reference value Ref, it may indicate that it is appropriate to use the satellite signal for an internal signal processing operation, so that the reduction of the transmission power of the modem circuit is maintained. However, when the accuracy of the position information is greater than the second reference value Ref, it may indicate that some of the satellite signals (for example, the satellite signals including the interference signals) are not to be used for the internal signal processing operation, so that the GNSS receiver outputs the control information for increasing the transmission power of the modem circuit (S34). For example, if the GNSS receiver has already received and processed satellite signals from a certain number of satellites, and the position information calculated therefrom is deemed to be accurate enough, the modem circuit can begin operating at a higher power level even if this causes the GNSS receiver to ignore additional satellite signals. Also, the GNSS receiver blocks the internal signal processing operation (for example, the decoding operation) with respect to the satellite signal in response to the blanking signal, in a state in which the transmission power of the modem circuit is increased (S35). For example, once the transmission power of the modem circuit is above a certain threshold, the GNSS receiver can block the internal signal processing operation when the blanking signal is activated.

Figure 7:
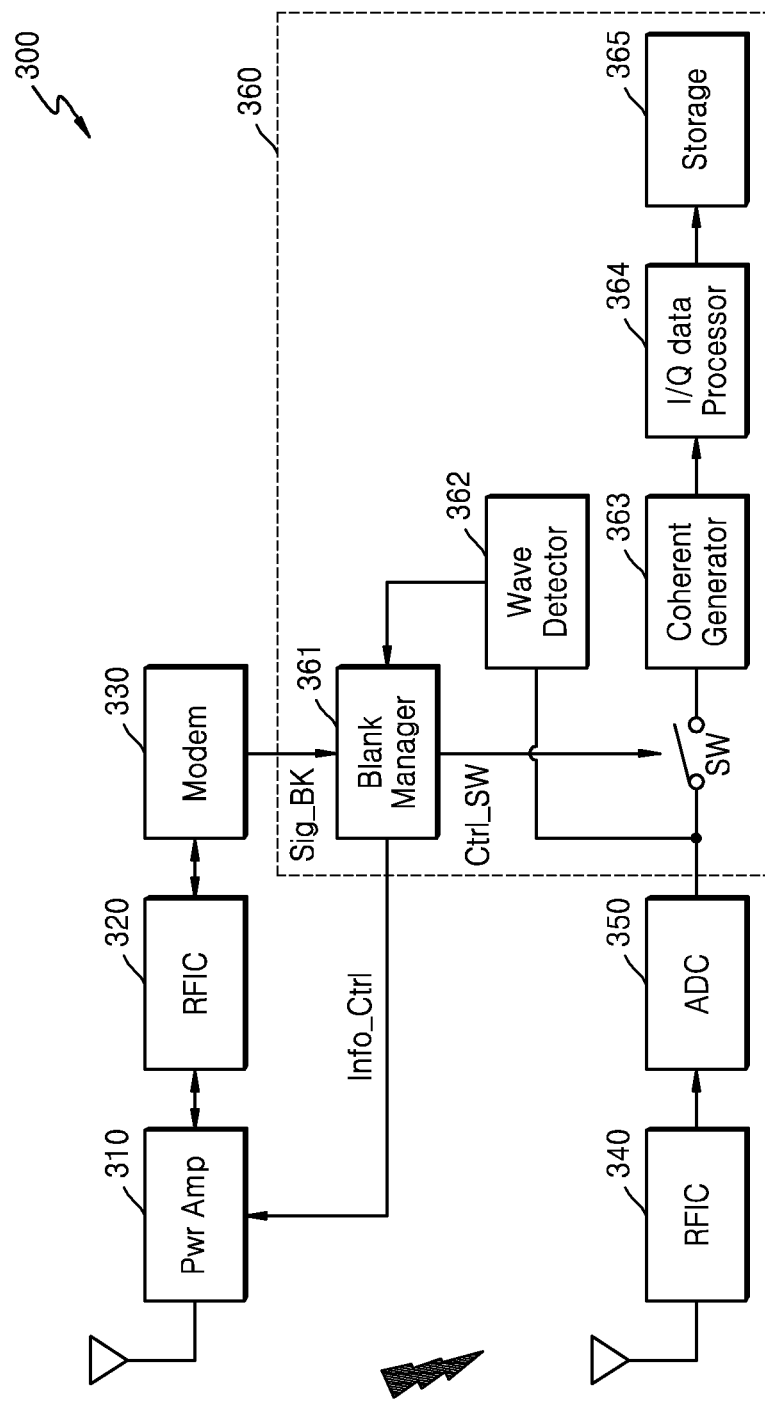
FIG. 7 is a block diagram of a detailed example of an electronic system including a GNSS receiver, according to an exemplary embodiment of the inventive concept.

FIG. 7 is a block diagram of a detailed example of an electronic system 300 including a GNSS receiver 360, according to an exemplary embodiment of the inventive concept.

Referring to FIG. 7, the electronic system 300 includes a power amplifier 310, an RF chip (RFIC) 320, and a modem circuit 330. The modem circuit 330 may provide a transmission signal to the RFIC 320 via a baseband signal processing operation, the RFIC 320 may provide the transmission signal to the power amplifier 310 based on a carrier frequency based on a certain communication standard, and the power amplifier 310 may amplify power of the transmission signal and output the amplified transmission signal via an antenna.

The GNSS receiver 360 includes a blank manager 361, a wave detector 362, a coherent generator 363, an I/Q data processor 364, and a storage device 365. The blank manager 361 may be implemented by the blank manager 121. Also, the electronic system 300 may further include an RFIC 340 for receiving a satellite signal and an analog-to-digital converter (ADC) 350. The RFIC 340 and the ADC 350 are included in the GNSS receiver 360. The ADC 350 may be included in the RFIC 340.

The GNSS receiver 360 further includes a switching circuit SW, of which a switching operation is controlled in response to a control signal Ctrl_SW of the blank manager 361. In an embodiment, the switching circuit SW is located between the ADC 350 and the coherent generator 363, and may provide the satellite signal on which a digital conversion is performed by the ADC 350, to the coherent generator 363, or may block the satellite signal from being provided to the coherent generator 363. In an embodiment, the coherent generator 363 performs a signal processing operation for detecting a type (or ID information) of a satellite generating the satellite signal, from among a plurality of satellites. The I/Q data processor 364 may extract satellite information via a decoding operation with respect to data (for example, I and Q data) included in the satellite signal. The storage device 365 may store the extracted satellite information.

Although not illustrated in FIG. 7, the GNSS receiver 360 may further include a navigation processor (not shown) configured to calculate the position information by using the satellite information stored in the storage device 365, wherein the position information of the GNSS receiver 360 may be calculated based on the signal processing operation of the navigation processor. Also, the internal signal processor 123 in the embodiment described above may include at least one of the coherent generator 363, the I/Q data processor 364, and the navigation processor. Also, the blocking of the decoding operation with respect to the satellite signal according to the embodiments described above may denote blocking of the internal signal processing operation with respect to the satellite signal. For example, it may denote that the satellite signal is blocked from being provided to the coherent generator 363.

An example of an operation of the electronic system 300 illustrated in FIG. 7 will be described as follows.

First, when the modem circuit 330 performs a transmission operation which generates an interference signal with the GNSS receiver 360, the modem circuit 330 provides a blanking signal Sig_BK to the blank manager 361. The blank manager 361 may provide the control signal Ctrl_SW to the switching circuit SW in response to the blanking signal Sig_BK, and the switching circuit SW may be turned off to block the decoding operation with respect to the satellite signal. In an embodiment, the switching circuit SW is a transistor and the control signal Ctrl_SW is applied to a gate terminal of the transistor.

In an embodiment, the wave detector 362 detects an intensity of a signal by detecting a waveform of the satellite signal provided from the ADC 350, and thus, may detect an intensity of the interference signal due to the harmonic element described above. FIG. 7 illustrates that the wave detector 362 detects the intensity of the interference signal from a node at a front end of the switching circuit SW. However, the wave detector 362 may detect the intensity of the interference signal from a node at a rear end of the switching circuit SW. Also, the wave detector 362 may provide a result of detecting the intensity of the interference signal to the blank manager 361. The wave detector 362 may detect the intensity by measuring the amplitude of the waveform. As shown in FIG. 3B, the amplitude of the noise could be significantly larger than the amplitude of the satellite signal.

The blank manager 361 may monitor a frequency at which the blanking signal Sig_BK is received and may control the blanking operation based on a result of the monitoring, according to the embodiments described above. The monitoring operation may be performed based on various references, such as a time during which the blanking signal Sig_BK is continually provided, the number of times in which the blanking signal Sig_BK is provided, etc. Also, whether or not the result of the monitoring exceeds a certain reference value may be determined. In an embodiment, when the frequency at which the blanking signal Sig_BK is received does not exceed the reference value, the blank manager 361 generates the control signal Ctrl_SW for turning off the switching circuit SW (e.g., opening a switch of the switching circuit) in response to the blanking signal Sig_BK.

In an embodiment, when the frequency at which the blanking signal Sig_BK is received exceeds the certain reference value, the blank manager 361 performs the control operation so that the switching circuit SW is turned on (e.g., switch is closed) to enable the decoding operation to be performed with respect to the satellite signal regardless of the blanking signal Sig_BK, in order to prevent the degradation of the performance of the GNSS receiver 360 due to the loss of the satellite signal. In addition, in order to reduce the intensity of the interference signal included in the satellite signal, the blank manager 361 may generate control information Info_Ctrl for controlling (or reducing) transmission power of the modem and may provide the generated control information Info_Ctrl to the power amplifier 310. The power amplifier 310 may control the transmission power based on the control information Info_Ctrl, by using a method of adjusting a gain of the amplifier. For example, the gain of the power amplifier 310 may be decreased to reduce the transmission power and increased to increase the transmission power.

FIG. 7 illustrates an example in which the control information Info_Ctrl is provided to the power amplifier 310. However, embodiments of the inventive concept are not limited thereto. For example, the control information Info_Ctrl may be provided to the RFIC 320 or the modem circuit 330, and the transmission power output from the power amplifier 310 may be adjusted under control of the RFIC 320 or the modem circuit 330.

Figure 8:
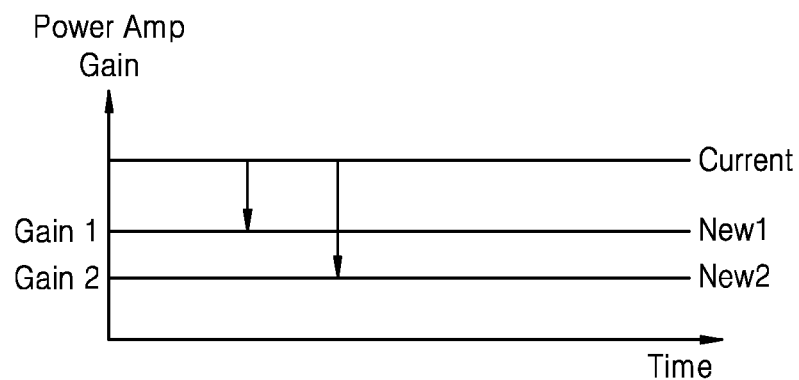
FIGS. 8, 9A, and 9B are waveform diagrams of examples of controlling transmission power of a modem.
Figure 9A:
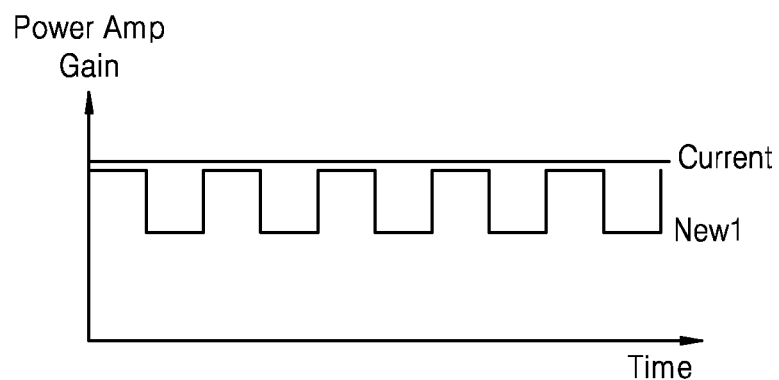
Figure 9B:
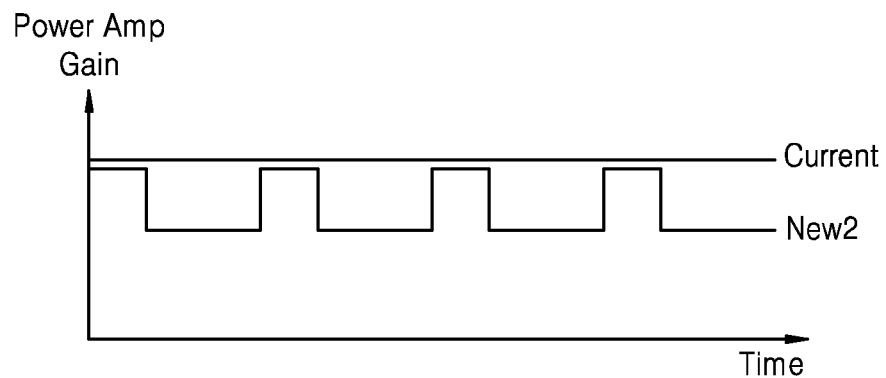

FIGS. 8, 9A and 9B are waveform diagrams of examples of controlling transmission power of a modem.

Referring to FIG. 8, when the transmission power of the modem is decreased as the frequency at which the blanking signal is received is increased, gain values of the power amplifier are decreased by a certain level compared to a current gain value. For example, the changed gain values Gain 1 and Gain 2 may be variously adjusted, and the changed gain values may be constantly maintained.

Referring to FIGS. 9A and 9B, the gain value of the power amplifier may be decreased compared to the current gain value, and the gain value may be selectively decreased during a certain section. For example, the gain value of the power amplifier may be decreased during only a section of a certain time period, and when it is assumed that the time period includes a first section and a second section, the gain value of the power amplifier may be decreased in the first section, while the gain value of the power amplifier is not decreased and maintains the current gain value in the second section.

For example, FIG. 9A illustrates that the first section is substantially the same as the second section in each time period, while FIG. 9B illustrates that the first section (i.e., the lower level section) is longer than the second section in each time period. That is, in the example of FIG. 9B, the section during which the transmission power of the modem is reduced is longer than that of the example of FIG. 9A, so that the performance (for example, the accuracy of the calculated position information) of the GNSS receiver may be further improved compared to that of the example of FIG. 9A. For example, the duty ratio in FIG. 9A is higher than the duty ratio in FIG. 9B.

The transmission power of the modem illustrated in FIGS. 8, 9A, and 9B may be variously adjusted based on a result of detecting the intensity of the interference signal due to the harmonic element. For example, when the intensity of the interference signal is relatively great, the reduction of the gain value of the power amplifier may be relatively increased to further improve the performance of the GNSS receiver. For example, in the example illustrated in FIG. 8, when the intensity of the interference signal is relatively great, the changed gain value may be the second gain value Gain 2. Alternatively, when the intensity of the interference signal is relatively great, the gain value of the power amplifier may be adjusted such that the first section is relatively greater than the second section in the time period, as illustrated in the example of FIG. 9B.

However, in the example illustrated in FIG. 8, when the intensity of the interference signal is relatively less, the changed gain value of the power amplifier may be the first gain value Gain 1. Alternatively, when the intensity of the interference signal is relatively less, the gain value of the power amplifier may be adjusted such that the first section is less than the second section in the time period, as illustrated in the example of FIG. 9A.

Figure 10:
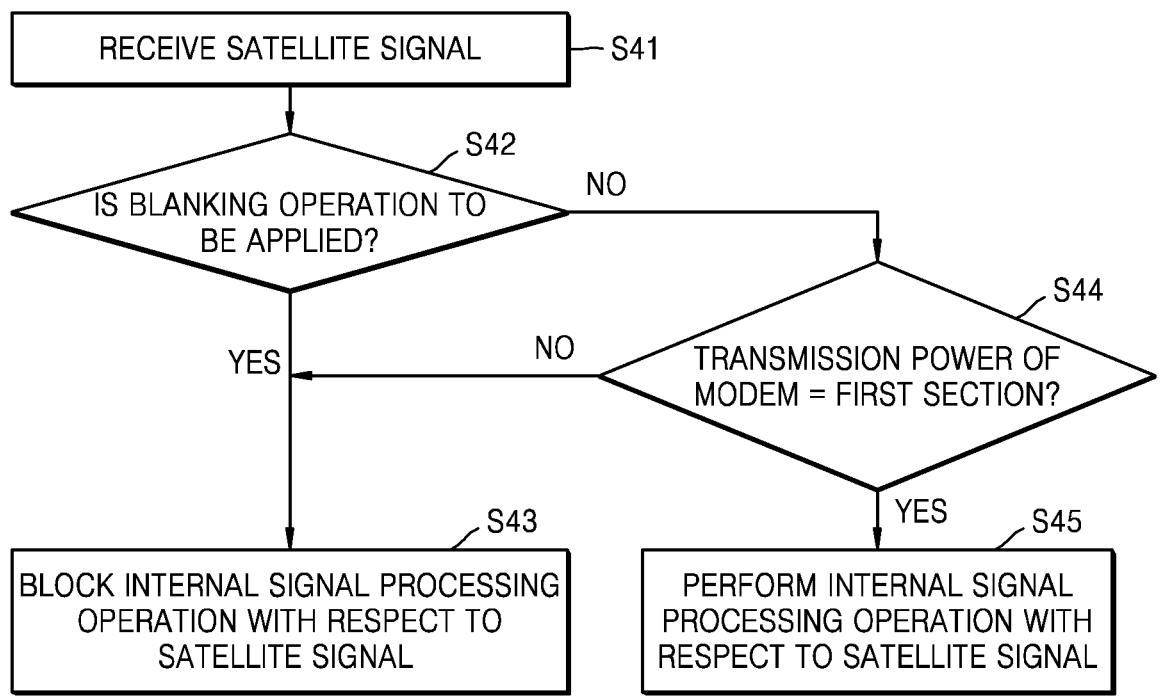
FIG. 10 is a flowchart of an operating method of a GNSS receiver, according to an exemplary embodiment of the inventive concept.

FIG. 10 is a flowchart of an operating method of a GNSS receiver, according to an exemplary embodiment of the inventive concept. FIG. 10 illustrates the operating method of the GNSS receiver when the gain value of the power amplifier is adjusted as illustrated in the embodiments of FIGS. 9A and 9B.

Referring to FIG. 10, the GNSS receiver receive a satellite signal (S41) according to the embodiments described above, and may or may not perform an internal signal processing operation, such as a decoding operation, etc., with respect to the satellite signal, in response to a blanking signal from a modem circuit. The GNSS receiver determines whether or not to apply a blanking operation (or whether or not to block the internal signal processing operation in response to the blanking signal) with respect to the current satellite signal (S42), and when the blanking operation is applied, the GNSS receiver blocks the internal signal processing operation with respect to the satellite signal in response to the blanking signal (S43).

When the blanking operation is not applied, the GNSS receiver identifies a state of transmission power of the modem in order to determine whether or not to perform the internal signal processing operation with respect to the satellite signal in response to the blanking signal (S44). For example, when the blanking operation is not applied, the transmission power of the modem is reduced, and while the transmission power of the modem is reduced in the first section in the time period, the transmission power of the modem is not reduced in the second section in the time period, according to the embodiment described above. In an embodiment, the identification of the state of the transmission power of the modem include identifying whether or not the transmission power of the modem has the transmission power in the first section.

When the satellite signal is received in the second section in the time period, it indicates that the satellite signal is received in a situation in which the transmission power of the modem is relatively great, and thus, there is a higher possibility that the interference signal is included in the satellite signal. Accordingly, the GNSS receiver blocks the internal signal processing operation with respect to the satellite signal received in the second section, in response to the blanking signal (S43). However, when the satellite signal is received in the first section in the time period, it indicates that the satellite signal is received in a situation in which the transmission power of the modem is relatively less, and thus, there is a relatively lower possibility that the interference signal is included in the satellite signal. Accordingly, the GNSS receiver performs the internal signal processing operation with respect to the satellite signal received in the first section, even if the blanking signal is received (S45).

According to the embodiment described above, the GNSS receiver blocks the internal signal processing operation in response to the blanking signal, when the frequency at which the blanking signal is received is low. Also, when the frequency at which the blanking signal is received is high, the GNSS receiver discards or ignores the satellite signal only in the section during which the transmission power of the modem is high, and uses the satellite signal for the decoding operation in the section during which the transmission power of the modem is low. Thus, the degradation of the performance of the GNSS receiver, which may be caused by excessively discarding the satellite signal, may be prevented. Also, since the first section and the second section are appropriately set for adjusting the transmission power of the modem, the section during which the transmission power of the modem is reduced may be set to be as low as possible, so that the performance of the modem circuit may be appropriately obtained.

Figure 11A:
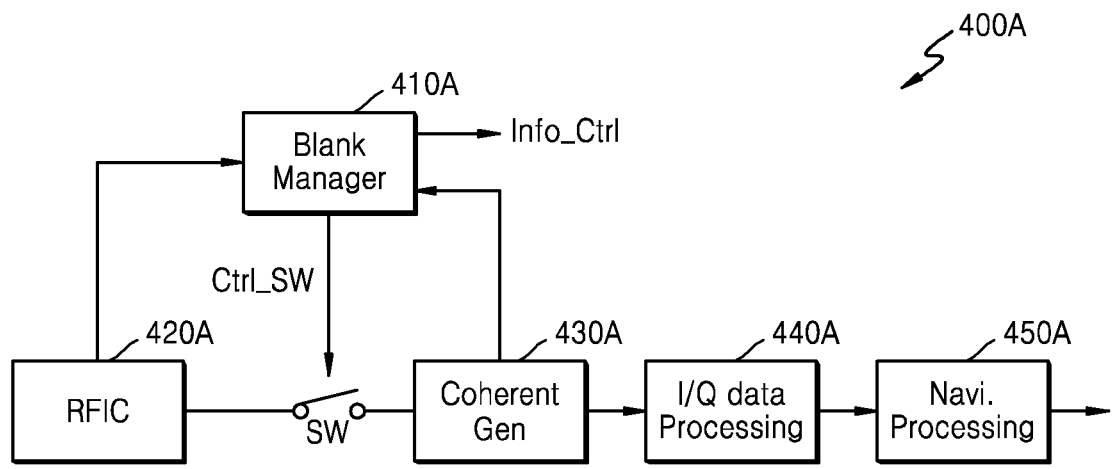
FIGS. 11A and 11B are block diagrams of GNSS receivers according to exemplary embodiments of the inventive concept.
Figure 11B:
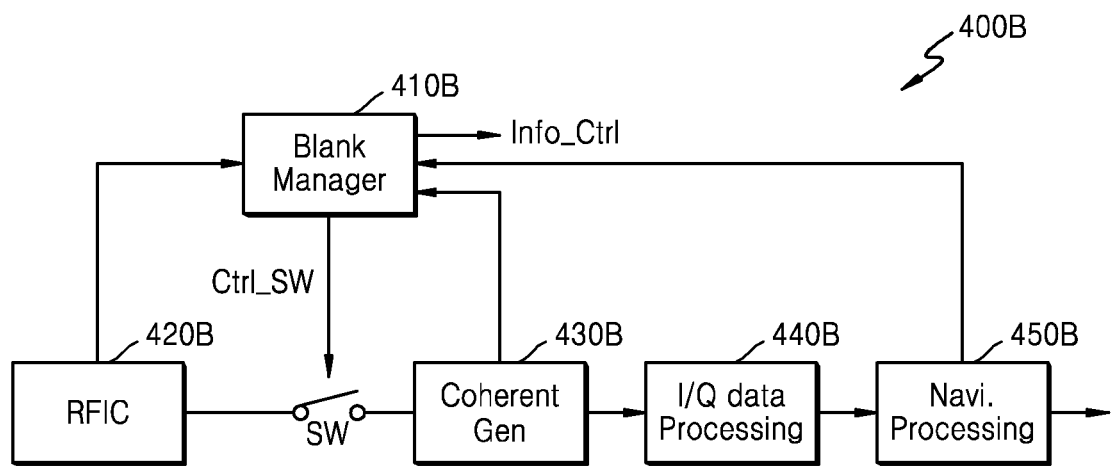

FIGS. 11A and 11B are block diagrams of GNSS receivers 400A and 400B according to various embodiments. In the embodiments illustrated in FIGS. 11A and 11B, repeated aspects of the components and operations of the embodiments described above will not be described in detail.

Referring to FIG. 11A, the GNSS receiver 400A includes a blank manager 410A, an RFIC 420A, a coherent generator 430A, an I/Q data processor 440A, a navigation processor 450A, and a switching circuit SW.

The blank manager 410A may use various information in the GNSS receiver 400A for adjusting transmission power of a modem. For example, the blank manager 410A may receive first information (for example, information of an intensity of an interference signal) from the RFIC 420A and second information (for example, information of a frequency at which a blanking signal is received) from the coherent generator 430A. In an embodiment, the blank manager 410A generates a control signal Ctrl_SW based on the received first and second information and generates control information Info_Ctrl. For example, the blank manager 410A may generate the control signal Ctrl_SW based on the second information from the coherent generator 430A to turn on the switching circuit SW, and may output the control information Info_Ctrl to reduce the transmission power of the modem.

Referring to FIG. 11B, the GNSS receiver 400B includes a blank manager 410B, an RFIC 420B, a coherent generator 430B, an I/Q data processor 440B, a navigation processor 450B, and a switching circuit SW. In addition to the first and second information, the blank manager 410B may further receive third information (for example, information of an accuracy of position information) from the navigation processor 450B. The blank manager 410B may generate a control signal Ctrl_SW and control information Info_Ctrl by using the first through third information.

According to an embodiment, the third information from the navigation processor 450B may be used as information for converting from a case in which a blanking operation is not applied to a case in which the blanking operation is applied. For example, when the blanking operation is not applied based on the frequency at which the blanking signal is received, and the accuracy of the position information is sufficiently improved based on the third information, the blanking operation, whereby a satellite signal is discarded or ignored in response to the blanking signal, may be applied again to the GNSS receiver 400B.

The third information may be used for other operations. For example, the transmission power of the modem may be adjusted based on the third information. For example, when the accuracy of the position information is decreased, the reduction of the transmission power of the modem may be increased. However, when the accuracy of the position information is increased, the reduction of the transmission power of the modem may be decreased.

Figure 12:
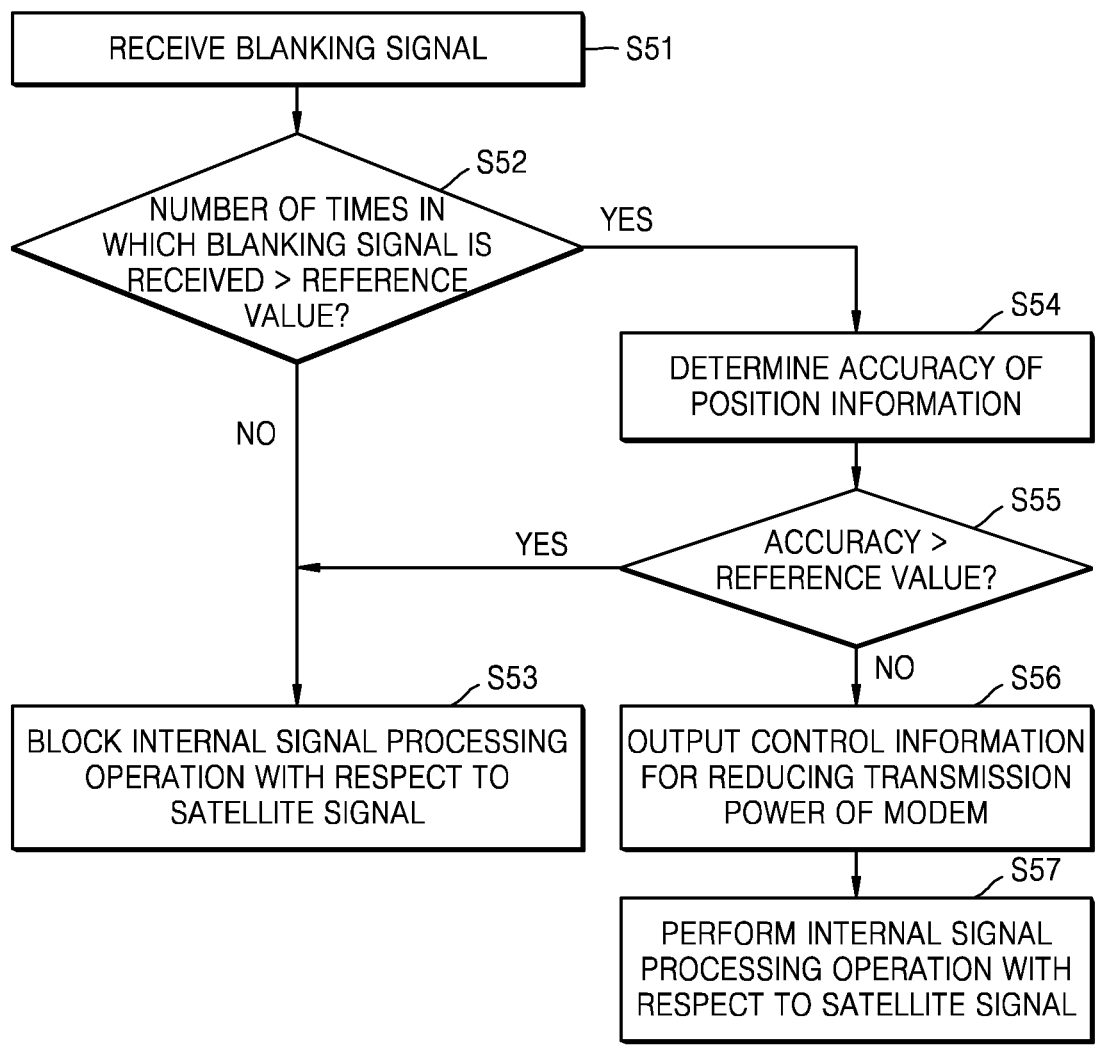
FIG. 12 is a flowchart of an operating method of a GNSS receiver, according to an exemplary embodiment of the inventive concept.

FIG. 12 is a flowchart of an operating method of a GNSS receiver, according to an exemplary embodiment of the inventive concept. FIG. 12 illustrates a case in which whether or not to apply a blanking operation is determined by further using the accuracy of the position information illustrated in FIG. 11B.

The information of the accuracy of the position information in the embodiment described above may also be used to determine whether or not to apply the blanking operation. For example, as illustrated in FIG. 12, the GNSS receiver receives a blanking signal from a modem circuit (S51), and determines whether a frequency at which the blanking signal is received, exceeds a reference frequency (S52). The frequency at which the blanking signal is received may be determined based on various methods. For example, the number of times in which the blanking signal is received during a certain time period may be compared with a reference value. For example, if the number of times is greater than the reference value, the frequency exceeds the reference frequency.

When the frequency at which the blanking signal is received is low, since the number of times in which the blanking signal is received does not exceed the reference value, the blanking operation is applied so that an internal processing operation of a satellite signal is prevented (S53). However, when the frequency at which the blanking signal is received is high, since the number of times in which the blanking signal is received exceeds the reference value, the accuracy of the position information calculated in the GNSS receiver is determined (S54) and whether or not the determined accuracy exceeds a certain reference value is further determined (S55).

When the accuracy of the position information satisfies the certain reference value, even though the frequency at which the blanking signal is received is increased, the blanking operation is applied without reduction of transmission power of the modem, so that the internal processing operation of the satellite signal is blocked in response to the blanking signal (S53). However, when the accuracy of the position information is decreased since the frequency at which the blanking signal is received is increased, the blanking operation is blocked from being applied and control information for reducing the transmission power of the modem is output (S56), according to the embodiments described above. Also, since the blanking operation is blocked from being applied, the internal processing operation of the satellite signal is performed even when the blanking signal is received (S57).

FIGS. 13 through 16 are block diagrams of various examples of GNSS receivers 720 and 810 and application processors 510 and 610, according to embodiments of the inventive concept.

Figure 13:
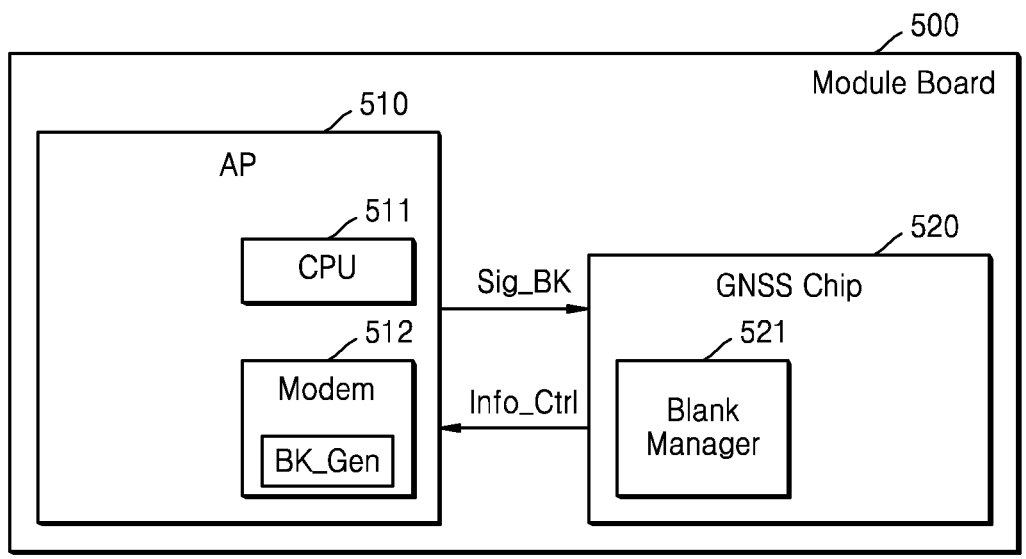
FIGS. 13 through 16 are block diagrams of various examples of GNSS receivers and application processors, according to exemplary embodiments of the inventive concept.

Referring to FIG. 13, the application processor 510 and the GNSS receiver may be realized via separate semiconductor chips, and thus, the GNSS receiver may be included in a GNSS chip 520. Also, the application processor 510 may include a CPU 511 and a modem circuit 512, and the GNSS chip 520 may include a blank manager 521 according to the embodiments described above. A module including the application processor 510 and the GNSS chip 520 may be manufactured, and thus, the application processor 510 and the GNSS chip 520 may be mounted on a module board.

The modem circuit 512 may include a blanking signal generator 512 configured to generate a blanking signal Sig_BK according to the embodiments described above, and the modem circuit 512 and the GNSS chip 520 may transmit and receive information to and from each other on the module board via at least one hardware wire. For example, the modem circuit 512 may provide the blanking signal Sig_BK to the GNSS chip 520 via the hardware wire, and the GNSS chip 520 may provide the control information Info_Ctrl, according to the embodiments described above, to the modem circuit 512 via the hardware wire. In an exemplary embodiment, the control information Info_Ctrl is directly provided to a power amplifier configured to control transmission power of the modem.

Figure 14:
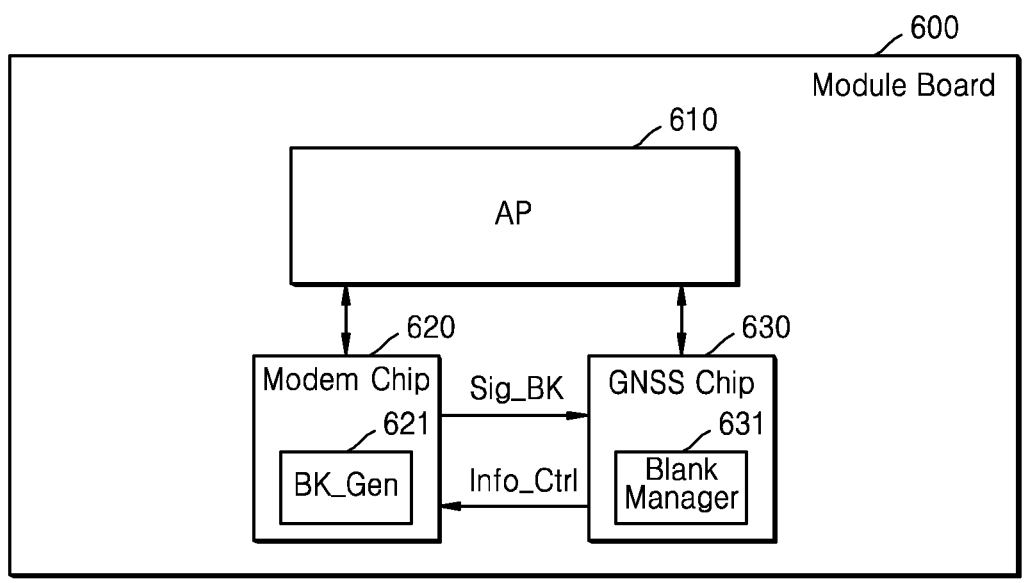

Referring to FIG. 14, the application processor 610, a modem chip 620, and a GNSS chip 630 may be realized via separate semiconductor chips, and the application processor 610, the modem chip 620, and the GNSS chip 630 may be mounted on a module board. Each of the modem chip 620 and the GNSS chip 630 may communicate with the application processor 610, and the modem chip 620 and the GNSS chip 630 may transmit and receive information to and from each other via a hardware wire. According to the embodiments described above, the modem chip 620 may include a blanking signal generator 621, and the GNSS chip 630 may include a blank manager 631. The blanking signal Sig_BK and the control information Info_Ctrl may be transmitted and received between the modem chip 620 and the GNSS chip 630.

Figure 15:
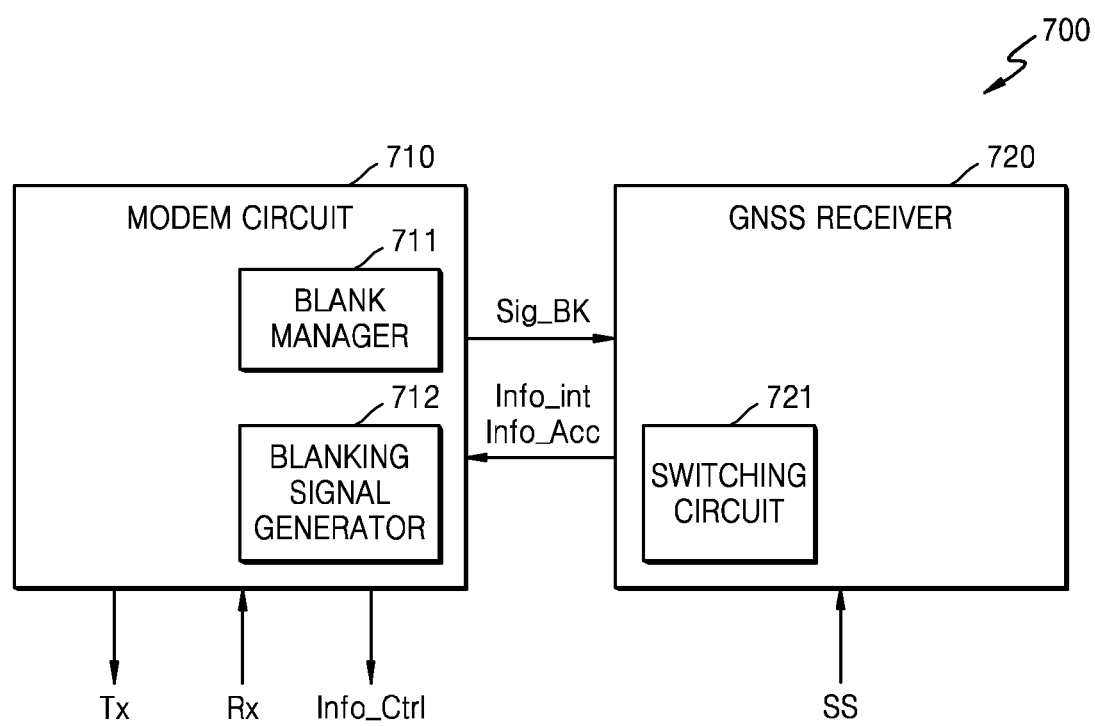

FIG. 15 is a diagram of an electronic system 700 according to an exemplary embodiment of the inventive concept, wherein the electronic system 700 includes a modem circuit 710 and the GNSS receiver 720. A blanking signal generator 712, and a blank manager 711 may be included in the modem circuit 710 according to the embodiments described above. Also, the GNSS receiver 720 may include a switching circuit 721, of which a switching operation is controlled in response to the blanking signal Sig_BK.

The blank manager 711 may determine whether or not to apply a blanking operation according to the embodiments described above, and may output the blanking signal Sig_BK based on the determination. For example, the modem circuit 710 may provide the blanking signal Sig_BK to the GNSS receiver 720, and thus, the blank manager 711 may monitor a frequency at which the blanking signal Sig_BK is provided and may determine whether or not to apply the blanking operation based on a result of the monitoring. Also, adjusting of the transmission power of the modem according to the embodiments described above may be performed by using information Info_int of an intensity of an interference signal and/or information Info_Acc of an accuracy of position information. According to an embodiment, the GNSS receiver 720 provides the information of the intensity of the interference signal Info_int and/or the information of the accuracy of the position information Info_Acc to the modem circuit 710.

The modem circuit 710 outputs a transmission signal Tx and receives a reception signal Rx, and the GNSS receiver 720 receives a satellite signal SS. When the frequency at which the blanking signal Sig_BK is provided exceeds a reference value, the blank manager 711 blocks the provision of the blanking signal Sig_BK so that the GNSS receiver 720 performs an internal processing operation with respect to the satellite signal SS. The modem circuit 710 may output control information Info_Ctrl for reducing power of the transmission signal Tx based on information of the intensity of the interference signal Info_int and/or the information of the accuracy of the position information Info_Acc received from the GNSS receiver 720. Also, according to the embodiments described above, whether or not to apply the blanking operation may be determined by further using the information of the accuracy of the position information Info_Acc, in addition to the frequency at which the blanking signal Sig_BK is provided.

Figure 16:
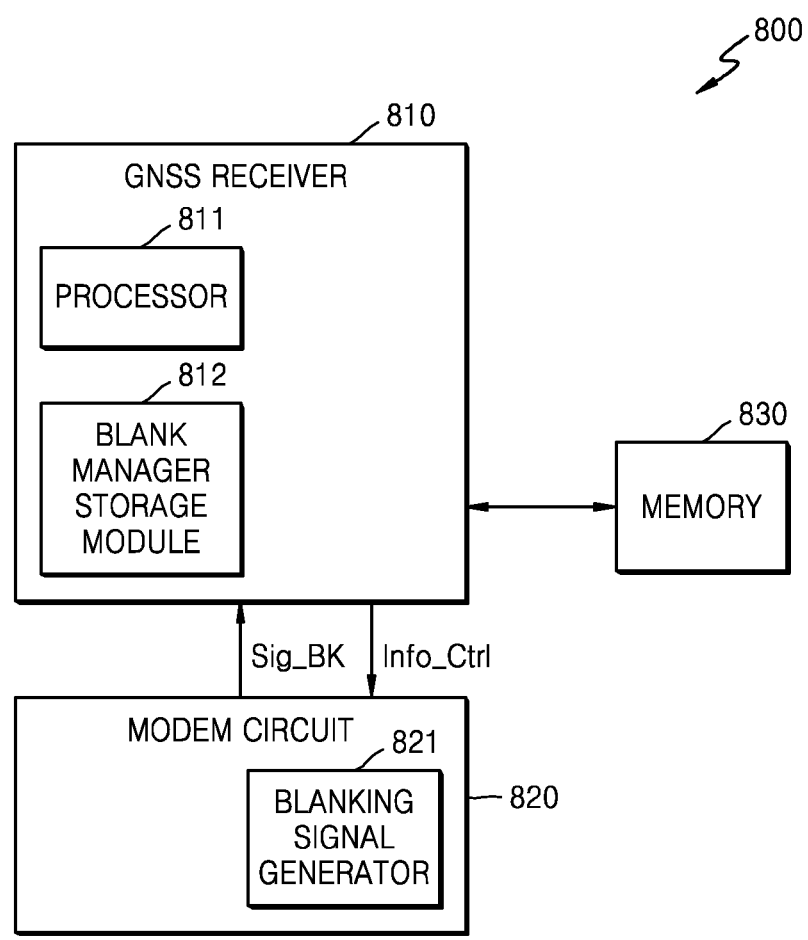

Referring to FIG. 16, an example in which the operation of the blank manager, according to the embodiments described above, is realized via software is illustrated. An electronic system 800 includes a GNSS receiver 810, a modem circuit 820, and a memory 830, and the GNSS receiver 810 includes a processor 811 and a blank manager storage module 812. Also, according to the embodiments described above, the modem circuit 820 includes a blanking signal generator 821, and the blanking signal generator 821 provides a blanking signal Sig_BK to the GNSS receiver 810, and the GNSS receiver 810 provides control information Info_Ctrl to the modem circuit 820.

Assuming that the GNSS receiver 810 and the modem circuit 820 are included in an application processor, the memory 830 may be an internal memory provided in the application processor or an external memory provided outside the application processor. Also, the function of the blank manager, according to the embodiments described above, may be realized via software including programs executable by a processor, and the programs may be stored in the blank manager storage module 812. Also, the programs stored in the blank manager storage module 812 may be loaded to the memory 830, and the processor 811 may execute the programs loaded to the memory 830, to realize the function of the blank manager according to the embodiments described above.

Figure 17:
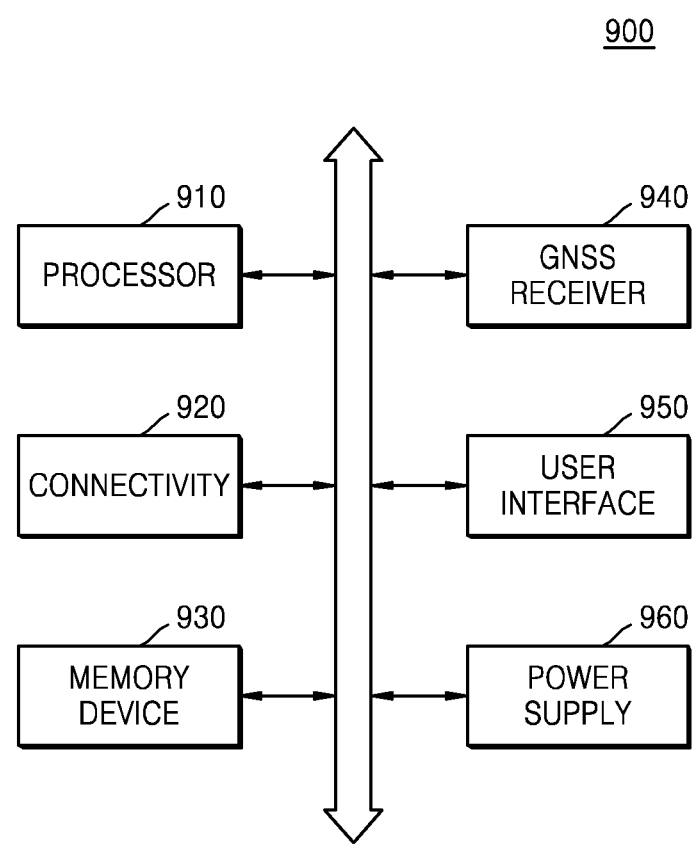
FIG. 17 is a block diagram of an example of a mobile system including a GNSS receiver according to an exemplary embodiment of the inventive concept.

FIG. 17 is a block diagram of an example of a mobile system 900 including a GNSS receiver 940 according to an exemplary embodiment of the inventive concept.

Referring to FIG. 17, the mobile system 900 includes a processor 910, a connectivity device 920, a memory device 930, the GNSS receiver 940, a user interface 950, and a power supply 960. The processor 910 may execute various computing functions, such as specific calculations or tasks. For example, the processor 910 may include arbitrary processors, such as a CPU, a microprocessor, an application processor (AP), etc. The processor 910 may execute an operating system (OS) for driving the mobile system 900, and may execute various applications providing an Internet browser, a game, a video, a camera, etc. According to an embodiment, the processor 910 may include a single core processor or a multi-core processor.

The connectivity device 920 may include various types of communication modules.

For example, the connectivity device 920 may perform universal serial bus (USB) communication, Ethernet communication, near-field communication (NFC), radio frequency identification (RFID) communication, mobile telecommunication, memory card communication, etc.

The GNSS receiver 940 may be controlled by the processor 910, and the GNSS receivers according to the embodiments described above may be applied as the GNSS receiver 940 illustrated in FIG. 17. For example, the GNSS receiver may be applied to the GNSS receiver 940 illustrated in FIG. 17. For example, the GNSS receiver 940 may include an RFIC, a baseband processor, a storage device, etc., and a blank manager (not shown) according to the embodiments described above may further be included in the GNSS receiver 940. The GNSS receiver 940 may receive a blanking signal from one or more communication devices of the connectivity device 920, and may determine whether or not to apply a blanking operation using the blanking signal, or may output control information for adjusting power of an amplifier used by the connectivity device 920.

The memory device 930 may store data processed by the processor 910 or operate as a working memory. The memory device 930 may store a boot image for booting the mobile system 900, a file system related to the OS for driving the mobile system 900, a device driver related to an external device connected to the mobile system 900, the application executed by the mobile system 900, etc. For example, the memory device 930 may include at least one volatile memory, such as DRAM, SRAM, mobile DRAM, double data rate synchronous DRAM (DDR SDRAM), lower power DDR SDRAM (LPDDR SDRAM), graphics DDR SDRAM (GDDR SDRAM), rambus DRAM (RDRAM), etc., or at least one nonvolatile memory, such as electrically erasable programmable read-only memory (EEPROM), a flash memory, a phase change random access memory (PRAM), a resistance random access memory (RRAM), a nano-floating gate memory (NFGM), a polymer random access memory (PoRAM), a magnetic random access memory (MRAM), a ferroelectric random access memory (FRAM), etc.

The user interface 950 may include one or more input devices, such as a keypad, a button, a microphone, a touch screen, etc., and/or one or more output devices, such as a speaker, a display device, etc. The power supply 960 may supply an operation voltage of the mobile system 900.

While the inventive concept has been particularly shown and described with reference to embodiments thereof, it will be understood that various changes in form and details may be made therein without departing from the spirit and scope of the disclosure.

What is claimed is:

1. A global navigation satellite system (GNSS) receiver comprising:
a signal processor configured to perform an internal signal processing operation on a satellite signal to generate satellite information;
a switching circuit connected to the signal processor and configured to transmit or not transmit the satellite signal received from a radio signal frequency integrated circuit (RFIC) to the signal processor; and
a control circuit configured to receive a blanking signal from a communication device instructing that the internal signal processing operation using the satellite signal is to be blocked, and further configured to output control information for reducing transmission power for transmitting data used by the communication device and to control the switching circuit to transmit the satellite signal to the signal processor to enable the signal processor to perform the internal signal processing operation despite receiving the blanking signal when a frequency at which the blanking signal is received exceeds a reference value.

2. The GNSS receiver of claim 1, wherein the control circuit controls the switching circuit to block the satellite signal from being transmitted to the signal processor when the frequency does not exceed the reference value.

3. The GNSS receiver of claim 1, wherein the RFIC receives satellite data from one or more external satellites, wherein the RFIC comprises an analog-to-digital converter performing an analog-to-digital conversion on the satellite data to generate the satellite signal, and analog-to-digital converter outputs the satellite signal to the switching circuit.

4. The GNSS receiver of claim 1, wherein the communication device comprises a modem circuit that outputs the blanking signal each time the modem circuit outputs the data.

5. The GNSS receiver of claim 4, further comprising a wave detector configured to detect an intensity of an interference signal included in the satellite signal, wherein the control circuit is configured to output the control information for adjusting the transmission power for transmitting the data further based on the detected intensity.

6. The GNSS receiver of claim 1, wherein the control circuit is further configured to count a number of times the blanking signal has been received in a certain time period to determine the frequency.

7. The GNSS receiver of claim 1, wherein the frequency at which the blanking signal is received exceeds the reference value is a number of times that the blanking signal is continually received exceeds the reference value.

8. The GNSS receiver of claim 1, wherein the control circuit is further configured to output the control information such that the transmission power for transmitting the data is decreased to a constant value.

9. The GNSS receiver of claim 1, wherein the control circuit is further configured to output the control information such that the transmission power for transmitting the data alternates between a first level and a second level higher than the first level.

10. The GNSS receiver of claim 9, wherein the control circuit is further configured to control the switching circuit to transmit the satellite signal to the signal processor when the transmission power has the first level and to control the switching circuit to block the satellite signal from being transmitted to the signal processor when the transmission power has the second level.

11. The GNSS receiver of claim 1, wherein the control circuit is further configured to use accuracy information indicating an accuracy of position information generated by the internal signal processing operation in the GNSS receiver, and output of the control information is further conditioned on the accuracy information.

12. An operating method of a global navigation satellite system (GNSS) receiver, the method comprising:
receiving, from a modem circuit, a blanking signal for instructing to block a decoding operation with respect to a satellite signal;
blocking, in response to the blanking signal, a decoding operation from being performed on the satellite signal;
determining whether a frequency at which the blanking signal is received exceeds a certain reference value during a certain time period;
performing the decoding operation despite receiving the blanking signal when the frequency exceeds the certain reference value; and
outputting control information for adjusting transmission power used for data communication by the modem circuit when the frequency is determined to exceed the certain reference value.

13. The operating method of claim 12, further comprising:
receiving the blanking signal from the modem circuit, in a state in which the power used for data communication related to the modem circuit is reduced based on the control information; and
performing the decoding operation with respect to the satellite signal regardless of the received blanking signal.

14. The operating method of claim 12, further comprising continuing to block the decoding operation when the frequency is determined not to exceed the certain reference value.

15. An application processor comprising:
a modem circuit configured to output a transmission signal via an external communication, and to generate a blanking signal, when performing a communication causing interference with another communication device; and
a global navigation satellite system (GNSS) receiver configured to perform a decoding operation on a satellite signal received from one or more satellites, to block the decoding operation on the satellite signal based on the blanking signal provided from the modem circuit, wherein the GNSS receiver comprises a control circuit,
wherein the control circuit is configured to block the decoding operation from being performed on the satellite signal in response to the blank signal when a frequency at which the blanking signal is received does not exceed a reference value or to perform the decoding operation on the satellite signal in response to the blank signal when the frequency exceeds the reference value and to output control information to the modem circuit for reducing a transmission power used for outputting the transmission signal.

16. The application processor of claim 15, further comprising a communication module configured to perform one or more types of communications, wherein the GNSS receiver is further configured to receive a blanking signal generated from the communication module and to output the control information to the communication module based on a frequency at which the blanking signal is received from the communication module.

17. The application processor of claim 16, wherein the communication module comprises a communication module of at least one of Wi-Fi communication, universal serial bus (USB) communication, Ethernet communication, near-field communication (NFC), and radio frequency identification (RFID) communication.

18. The application processor of claim 15, wherein the modem circuit is configured to control a power amplifier disposed outside the application processor and configured to perform an amplifying operation on the transmission signal, and the modem circuit is further configured to adjust a gain value of the power amplifier in response to the control information.

19. The application processor of claim 15, wherein the GNSS receiver further comprises a wave detector configured to detect an intensity of an interference signal included in the satellite signal, and the control circuit is further configured to output the control information for adjusting the transmission power of the modem circuit based on the detected intensity.

20. The application processor of claim 15, further comprising an internal memory storing a program for controlling whether to perform the decoding operation with respect to the satellite signal, and the control circuit comprises a processor for executing the program stored in the internal memory.

* * * * *